US011413622B2

(12) United States Patent
Steinwender et al.

(10) Patent No.: US 11,413,622 B2
(45) Date of Patent: Aug. 16, 2022

(54) APPARATUS FOR SIMULTANEOUS GRINDING AND FROTH FLOTATION

(71) Applicant: Omya International AG, Oftringen (CH)

(72) Inventors: Michael Steinwender, Klagenfurt (AT); Jörg Sötemann, Rheinfelden (DE)

(73) Assignee: OMYA INTERNATIONAL AG, Oftringen (CH)

( * ) Notice: Subject to any disclaimer, the term of this patent is extended or adjusted under 35 U.S.C. 154(b) by 1243 days.

(21) Appl. No.: 15/526,059

(22) PCT Filed: Nov. 24, 2015

(86) PCT No.: PCT/EP2015/077465
§ 371 (c)(1),
(2) Date: May 11, 2017

(87) PCT Pub. No.: WO2016/083353
PCT Pub. Date: Jun. 2, 2016

(65) Prior Publication Data
US 2017/0312759 A1    Nov. 2, 2017

Related U.S. Application Data

(60) Provisional application No. 62/111,145, filed on Feb. 3, 2015.

(30) Foreign Application Priority Data

Nov. 28, 2014  (EP) .................................... 14195365

(51) Int. Cl.
*B02C 17/18* (2006.01)
*B02C 23/30* (2006.01)
(Continued)

(52) U.S. Cl.
CPC ............ *B02C 17/186* (2013.01); *B02C 17/16* (2013.01); *B02C 17/161* (2013.01);
(Continued)

(58) Field of Classification Search
CPC ........ B03D 1/087; B03D 1/1418; B03D 1/26; B03D 1/16; B03D 1/1456; B03D 1/02;
(Continued)

(56) References Cited

U.S. PATENT DOCUMENTS 4,109,874 A    8/1978  Stoev et al.
5,167,375 A   12/1992  Datta
(Continued)

FOREIGN PATENT DOCUMENTS

CA          2059713         1/1992
CA          2059713 A1  *  7/1993  ............. B02C 17/16
(Continued)

OTHER PUBLICATIONS

The International Search Report dated Mar. 3, 2016 for PCT/EP2015/077465.
(Continued)

*Primary Examiner* — Adam J Eiseman
*Assistant Examiner* — Matthew Stephens
(74) *Attorney, Agent, or Firm* — Fay Sharpe LLP

(57) ABSTRACT

The present invention relates to apparatus for simultaneous grinding and froth flotation of at least one crude mineral and/or pigment, a process carried out in the apparatus for manufacturing at least one ground mineral and/or pigment, use of the ground mineral and/or pigment bearing phase obtainable by the process in paper applications as well as in paper, plastics, paints, coatings, adhesives, sealants, food, feed, pharma, concrete, cement, cosmetic, water treatment and/or agriculture applications, preferably in a wet end process of paper machine, in cigarette paper, board, and/or
(Continued)

coating applications, or as support for rotogravure and/or offset and/or ink jet printing and/or continuous ink jet printing and/or flexography and/or electrophotography and/or decoration surfaces and the ground mineral and/or pigment bearing phase or ground mineral and/or pigment obtainable by the process.

20 Claims, 3 Drawing Sheets

(51) Int. Cl.
    *B03D 1/08*     (2006.01)
    *B03D 1/14*     (2006.01)
    *B02C 17/16*     (2006.01)
    *B02C 23/14*     (2006.01)
    *B02C 23/36*     (2006.01)
    *B03D 1/016*     (2006.01)
    *B03D 1/02*     (2006.01)
    *B03D 1/16*     (2006.01)
    *B03D 1/26*     (2006.01)

(52) U.S. Cl.
    CPC .......... *B02C 17/163* (2013.01); *B02C 17/184* (2013.01); *B02C 17/185* (2013.01); *B02C 17/1835* (2013.01); *B02C 23/14* (2013.01); *B02C 23/30* (2013.01); *B02C 23/36* (2013.01); *B03D 1/016* (2013.01); *B03D 1/02* (2013.01); *B03D 1/082* (2013.01); *B03D 1/087* (2013.01); *B03D 1/1418* (2013.01); *B03D 1/1456* (2013.01); *B03D 1/1462* (2013.01); *B03D 1/1475* (2013.01); *B03D 1/16* (2013.01); *B03D 1/26* (2013.01); *B03D 1/028* (2013.01); *B03D 2201/005* (2013.01); *B03D 2201/02* (2013.01); *Y02P 40/10* (2015.11)

(58) Field of Classification Search
    CPC .... B03D 1/016; B03D 1/1475; B03D 1/1462; B03D 1/082; B03D 1/028; B03D 2201/02; B03D 2201/005; B02C 17/16; B02C 23/36; B02C 17/161; B02C 23/30; Y02P 40/20

See application file for complete search history.

(56) References Cited

U.S. PATENT DOCUMENTS

| | | | |
|---|---|---|---|
| 5,312,055 A * | 5/1994 | Barthelmess | ........... B02C 17/16 241/172 |
| 8,205,817 B2 * | 6/2012 | Brook-Levinson | .......................... B02C 17/163 241/171 |
| 8,403,146 B2 | 3/2013 | Hurd et al. | |
| 2009/0084874 A1 * | 4/2009 | Alam | ...................... B02C 17/16 241/21 |
| 2013/0284642 A1 * | 10/2013 | Teague | ................... B03D 1/021 209/3.1 |
| 2014/0231556 A1 * | 8/2014 | Small | ....................... B01J 19/10 241/21 |

FOREIGN PATENT DOCUMENTS

| | | | | |
|---|---|---|---|---|
| CN | 2497869 Y | 7/2002 | | |
| CN | 1401434 A | 3/2003 | | |
| CN | 201423313 Y | 3/2010 | | |
| CN | 101757981 A | 6/2010 | | |
| CN | 102076419 A | 5/2011 | | |
| DE | 356815 | 7/1922 | | |
| DE | 356815 C * | 7/1922 | ............... | B03D 1/16 |
| EP | 2722368 A1 | 4/2014 | | |
| EP | 2770017 A1 | 8/2014 | | |
| WO | 2008/084391 A1 | 7/2008 | | |
| WO | 2010/142844 A1 | 12/2010 | | |
| WO | 2011/113866 A1 | 9/2011 | | |
| WO | 2014/029634 A1 | 2/2014 | | |

OTHER PUBLICATIONS

The Written Opinion of the International Searching Authority dated Mar. 3, 2016 for PCT/EP2015/077465.

* cited by examiner

APPARATUS FOR SIMULTANEOUS GRINDING AND FROTH FLOTATION

CROSS-REFERENCE TO RELATED APPLICATIONS

This is a U.S. national phase of PCT Application No. PCT/EP2015/077465, filed Nov. 24, 2015, which claims priority to European Application No. 14195365.3, filed Nov. 28, 2014 and U.S. Provisional Application No. 62/111,145, filed Feb. 3, 2015.

The present invention relates to an apparatus for simultaneous grinding and froth flotation of at least one crude mineral and/or pigment, a process carried out in the apparatus for manufacturing at least one ground mineral and/or pigment, use of the ground mineral and/or pigment bearing phase obtainable by the process in paper applications as well as in paper, plastics, paints, coatings, concrete, adhesives, sealants, food, feed, pharma, cement, cosmetic, water treatment and/or agriculture applications, preferably in a wet end process of a paper machine, in cigarette paper, board, and/or coating applications, or as support for rotogravure and/or offset and/or ink jet printing and/or continuous ink jet printing and/or flexography and/or electrophotography and/or decoration surfaces and the ground mineral and/or pigment bearing phase or ground mineral and/or pigment obtainable by the process.

Crude minerals and/or pigments comprising calcium carbonate-comprising materials, barite, aluminium oxide or titanium oxide often further comprise impurities such as iron sulphides, iron oxides, silicates such as quartz, mica, amphibolites, feldspar, clay minerals and/or graphite in relatively high amounts. The separation of these materials into both a desired mineral and/or pigment fraction, e.g. a calcium carbonate-comprising fraction, and a reject impurity fraction, e.g. a silicate fraction, is of high interest to industry, as both fractions find applications in a wide variety of similar but also different domains. The apparatus according to the present invention is suitable for direct (i.e. mineral or pigment in the froth) and indirect (i.e. impurities in the froth) flotation for all kind of ores.

Calcium carbonate-comprising materials, for example, are widely used in paper applications as a filler or pigment in base paper sheets and/or in paper coating formulations. It is equally implemented in plastics, paint coatings, concrete, cement, cosmetic, water treatment and/or agriculture applications.

The most common methods for separating the mineral and/or pigment, such as calcium carbonate-comprising materials, and impurities such as silicates from one another involve physical-chemical separations whereby the crude mineral and/or pigment is first ground and then subjected to froth flotation in an aqueous environment by employing a means which selectively imparts hydrophobicity to the silicate-comprising fractions of the ground material to enable such components to be floated by association with a gas. Another method selectively imparts hydrophobicity to the mineral and/or pigment-comprising fractions of the ground material to enable such components to be floated and/or collected by a gas.

Means for separating the impurities from the mineral and/or pigment, such as calcium carbonate-comprising materials, are numerous and well known in the art, including U.S. Pat. No. 4,109,874, which refers to an apparatus for processing ore by a combined milling, froth flotation and size classifying operation, wherein a milling chamber contains elastomeric milling bodies situated between first and second screens. The milling chamber is provided with an agitating means for vertical vibration of the milling bodies. A first outlet on the milling chamber removes froth. A second outlet below the first and lowermost screen removes the coarser components.

CN 201423313 relates to a vertical grinding flotation machine. The vertical grinding flotation machine is characterized by including a cylinder body of the vertical grinding flotation machine, an upper cover of the cylinder body, a spraying plate arranged at the upper part of the cylinder body, a foam collecting tank which adopts a cofferdam type structure and is arranged on the outer wall at the upper part of the cylinder body, a rotary device, a stirring shaft with a stirring spiral at the lower half part, a beneficiation reagent pipe, an inlet pipe, an emptying opening, a tailing discharge pipe, labyrinth bodies of a labyrinth water seal device, a water inlet pipe which is arranged at the bottom part of the cylinder body of the vertical grinding flotation machine and is placed in the middle, a foam scraping plate which adopts a paddle-type scraping plate and is fixed on the stirring shaft, and an air inlet pipe arranged at the bottom part of the cylinder body of the vertical grinding flotation machine.

CN 2497869 relates to a tower milling flotation machine which is composed of a tower machine body, a mixing screw body and a driving mechanism, wherein the driving mechanism drives the mixing screw body through a mixing screw axis. The tower milling flotation machine is characterized in that the tower machine body is divided into an upper and a lower part which are a floating region and a floating while milling region, wherein the mixing screw body is arranged in the floating while milling region which is filled with milling medium; the upper part of the floating region is provided with an overflow trough, and the middle part is provided with an auxiliary floatation mixing impeller, and the lower part is provided with a gathering tough and a tailing ore removal opening.

CN 101757981 refers to a method and a device for simultaneously carrying out the grinding and floatation processes on ultrafine particles. An ultrasonic generating device is arranged in an integral flotation cell during the grinding and floatation processes, so ultrasonic waves can be generated by the ultrasonic generating device, to promote the flotation of currently ground pulp.

CN 1401434 refers to a tower-type grinding floatation machine for grinding and hydrosizing ore at same time is composed of tower-type main body divided into upper floatation region and lower grinding-hydrosizing region, screw stirrer, and drive mechanism. Said lower grinding-hydrosizing region contains screw stirrer and grinding medium.

CA 2,059,713 refers to an apparatus for simultaneous froth flotation and grinding of crude materials in continuous or batch mode comprising a vessel for containing grinding media, crude feed material to be ground and a flotation gas, an agitation unit rotatably mounted in the vessel, a drive means, connected to the agitation unit for rotating the unit to agitate the grinding media, and the feed material to pulverize the feed material into fine particles, and a discharge launder for collecting a froth at the top of the vessel to recover the fine particles with the froth.

However, the expert is still faced with the problem of efficiently separating minerals and/or pigments and impurities selectively that allows high mineral and/or pigment recovery.

Thus, there is still a need in the art to provide an apparatus for simultaneous grinding and froth flotation of at least one crude mineral and/or pigment and a process allowing a better performance than existing apparati and processes and especially an apparatus and process allowing an efficient separation of minerals and/or pigments and impurities. Thus, it is also desired to provide an apparatus for simultaneous grinding and froth flotation of at least one crude mineral and/or pigment and a process allowing a high mineral and/or pigment recovery. Furthermore, it is desired to provide an apparatus for simultaneous grinding and froth flotation of at least one crude mineral and/or pigment and a process allowing a high mineral and/or pigment recovery at minimized waste, and notably chemical waste. It is also desired to provide an apparatus for simultaneous grinding and froth flotation of at least one crude mineral and/or pigment allowing for efficient processing of high solids suspensions. It is further desired to provide an apparatus for simultaneous grinding and froth flotation of at least one crude mineral and/or pigment and a process being time efficient and therefore also being energy efficient.

It is thus an object of the present invention to provide an apparatus for simultaneous grinding and froth flotation of at least one crude mineral and/or pigment. It is a further object of the present invention to provide a process for manufacturing at least one ground mineral and/or pigment which is carried out in the apparatus. Another object may also be seen in the provision of an apparatus for simultaneous grinding and froth flotation of at least one crude mineral and/or pigment which provides the efficient separation of minerals and/or pigments and impurities. A further object of the present invention is to provide an apparatus for simultaneous grinding and froth flotation of at least one crude mineral and/or pigment and a process providing a high mineral and/or pigment recovery. A still further object may be seen in the provision of an apparatus for simultaneous grinding and froth flotation of at least one crude mineral and/or pigment and a process providing a high mineral and/or pigment recovery at minimized waste, and notably chemical waste. Another object may also be seen in the provision of an apparatus for simultaneous grinding and froth flotation of at least one crude mineral and/or pigment which allows the efficient processing of high solids suspensions. A still further object may be seen in the provision of an apparatus for simultaneous grinding and froth flotation of at least one crude mineral and/or pigment and a process allowing a time efficient separation of minerals and/or pigments and impurities and therefore is also energy efficient.

The foregoing and other objectives are solved by an apparatus for simultaneous grinding and froth flotation of at least one crude mineral and/or pigment, the apparatus comprising
    a) a vessel (1) suitable for containing grinding media (2), a flotation gas, a collector agent and at least one crude mineral and/or pigment;
    b) an agitation unit (3) rotatably mounted in vessel (1);
    c) drive means (4) connected to agitation unit (3) for agitating the grinding media (2) and the at least one crude mineral and/or pigment to grind the at least one crude mineral and/or pigment into at least one ground mineral and/or pigment;
    d) a charge system (5) connected to vessel (1) comprising
        i. a crude mineral and/or pigment feed (5a),
        ii. a collector agent feed (5b), and
        iii. a flotation gas inlet (5c);
    e) a discharge system (6) connected to vessel (1) comprising
        i. a sieve (6a) suitable for separating the froth from the ground mineral and/or pigment,
        ii. a product collecting zone (6b) suitable for collecting the ground mineral and/or pigment,
        iii. a froth collecting zone (6c) and
        iv. a froth redirecting zone (6d).

It should be understood that for the purposes of the present invention, the following terms have the following meaning:

Where an indefinite or definite article is used when referring to a singular noun, e.g., "a", "an" or "the", this includes a plural of that noun unless anything else is specifically stated.

Where the term "comprising" is used in the present description and claims, it does not exclude other elements. For the purposes of the present invention, the term "consisting of" is considered to be a preferred embodiment of the term "comprising". If hereinafter a group is defined to comprise at least a certain number of embodiments, this is also to be understood to disclose a group, which preferably consists only of these embodiments.

Terms like "obtainable" or "definable" and "obtained" or "defined" are used interchangeably. This, for example, means that, unless the context clearly dictates otherwise, the term "obtained" does not mean to indicate that, for example, an embodiment must be obtained by, e.g. the sequence of steps following the term "obtained" though such a limited understanding is always included by the terms "obtained" or "defined" as a preferred embodiment.

Advantageous embodiments of the present invention are defined in the corresponding sub-claims.

According to one embodiment of the apparatus, the froth collecting zone (6c) comprises spraying nozzles (6c1) and/or the discharge system (6) comprises a discharge control valve (6e) or a bypass with overflow (61) and/or the product collecting zone (6b) is ring-shaped and/or the froth collecting zone (6c) is ring-shaped and/or the froth redirecting zone (6d) is ring-shaped.

According to another embodiment of the apparatus, the mineral and/or pigment feed (5a) is connected to the bottom (7) of vessel (1), preferably to the centre (7a) of the bottom (7) or to the side (7b) of the bottom (7), more preferably tangential, most preferably the charge system (5) is connected to the bottom (7) of vessel (1); and/or the crude mineral and/or pigment feed (5a), the collector agent feed (5b) and the flotation gas inlet (5c) of the charge system (5) are connected to each other such that the flotation gas, preferably air, and the collector agent are fed together with the at least one crude mineral and/or pigment in vessel (1).

According to yet another embodiment of the apparatus, the at least one crude mineral and/or pigment has/have a weight median particle diameter $d_{50}$ in the range from 20.0 to 500.0 µm and the grinding media (2) have a bulk density in the range from 1.5 to 6.0 kg/dm³, preferably in the range from 2.0 to 5.0 kg/dm³ and more preferably in the range from 2.2 to 4.0 kg/dm³; and/or the grinding media (2) have a weight median particle diameter $d_{50}$ in the range from 0.2 to 5.0 mm, preferably in the range from 1.0 to 4.5 mm and more preferably in the range from 2.4 to 4.0 mm or the apparatus is for grinding and froth flotation of at least one crude mineral and/or pigment having a weight median particle diameter $d_{50}$ in the range from 0.5 to 20.0 µm and the grinding media (2) have a bulk density in the range from 1.5 to 6.0 kg/dm³, preferably in the range from 2.0 to 4.5 kg/dm³ and more preferably in the range from 2.5 to 3.0 kg/dm³; and/or the grinding media (2) have a weight median particle diameter $d_{50}$ in the range from 0.2 to 5.0 mm, preferably in the range from 0.3 to 4.0 mm and more preferably in the range from 0.4 to 3.0 mm.

According to another aspect of the present invention, a process carried out in said apparatus for manufacturing at least one ground mineral and/or pigment is provided. The process comprising the steps of I. providing at least one crude mineral and/or pigment, grinding media (2) and at least one collector agent in vessel (1);

II. mixing the at least one crude mineral and/or pigment, the grinding media (2) and the at least one collector agent as provided in step I. with water to form an aqueous suspension;

III. passing a flotation gas through flotation gas inlet (5c) into the aqueous suspension formed in step II. and agitating the obtained aqueous suspension by using agitation unit (3) to transform the at least one crude mineral and/or pigment into at least one ground mineral and/or pigment and obtaining thereby a ground mineral and/or pigment bearing phase and a froth;

IV. recovering the at least one ground mineral and/or pigment by removing the ground mineral and/or pigment bearing phase from the froth obtained in step III.

According to one embodiment of the process, the process involves a direct or an indirect flotation step leading to the formation of a froth containing the floated phase and a slurry bearing phase with the remaining ground mineral and/or pigment.

According to another embodiment of the process, at least one dispersing agent is added before or during step III. and/or the at least one crude mineral and/or pigment comprises at least one dispersing agent.

According to yet another embodiment of the process, the at least one dispersing agent is selected from the group consisting of sodium, potassium, calcium, magnesium, lithium, strontium, primary amine, secondary amine, tertiary amine and/or ammonium salts, whereby the amine salts are linear or cyclic, of at least partly neutralized homopolymers or copolymers of (meth)acrylic acid, maleic acid, fumaric acid, itaconic acid and derivatives of these acids like esters, or amides, such as methylmethacrylate, methylacrylate, acrylamide, sodium hydrogen phosphate or polyphosphates such as alkalipolyphosphates, carboxymethylcellulose, steric dispersants, comb polymers and/or mixtures thereof, preferably sodium polyacrylate having a molecular weight $M_w$ of from 4 000 to 10 000 g/mol, preferably from 4 000 to 8 000 g/mol and most preferably of about 6 000 g/mol; and/or the at least one collector agent is selected from the group consisting of surface active and hydrophobic tensides, preferably xanthate or thio phosphates, oleic acids, alkyl sulphates, polyalkylenimines, primary amines, tertiary amines, quaternary amines, fatty amines, esterquats, polyesterquats, imidazolines or quaternary imidazolium compounds, preferably quaternary imidazolium methosulphates as described in WO 2008/084391 A1, or compounds of formula (1) and (2) as defined below and mixtures of these compounds and described in WO 2014/029634 A1 and/or mixtures thereof; and/or the content of the at least one dispersing agent is in the range from 0.1 to 1.0 wt.-% based on the total weight of the at least one crude mineral and/or pigment in the aqueous suspension, preferably from 0.2 to 0.6 wt.-% based on the total weight of the at least one crude mineral and/or pigment in the aqueous suspension and more preferably in the range from 0.3 to 0.5 wt.-% based on the total weight of the at least one crude mineral and/or pigment in the aqueous suspension; and/or the content of the at least one collector agent is in the range from 0.001 to 5.0 wt.-% based on the total weight of the at least one crude mineral and/or pigment in the aqueous suspension as provided in step II., preferably from 0.05 to 0.8 wt.-% based on the total weight of the at least one crude mineral and/or pigment in the aqueous suspension as provided in step II. and most preferably in the range from 0.02 to 0.1 wt.-%, based on the total weight of the at least one crude mineral and/or pigment in the aqueous suspension as provided in step II; preferably the at least one dispersing agent is negatively charged and/or the at least one collector agent is non-ionic.

Compounds of Formula (1)

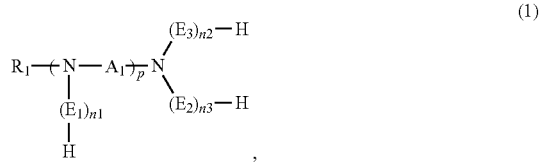

wherein $R_1$ represents a hydrocarbon group containing from 6 to 30 carbon atoms, $A_1$ represents an alkylene group having from 1 to 6 carbon atoms, $E_1$, $E_2$ and $E_3$, are identical or different from each other, each independently chosen from among alkylene oxide groups containing from 1 to 6 carbon atoms, $n_1$, $n_2$ and $n_3$, are identical or different from each other, each independently chosen from an integer which value is from 1 to 20, p is 1, 2, 3 or 4.

Compounds of Formula (2)

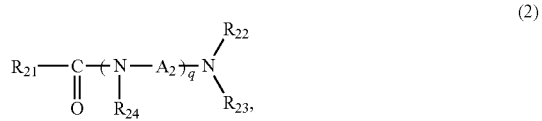

wherein $R_{21}$ represents a hydrocarbon group containing from 6 to 30 carbon atoms, $R_{22}$ and $R_{23}$ are identical or different from each other, each independently chosen from among hydrocarbon groups containing from 1 to 6 carbon atoms, $R_{24}$ represents hydrogen or a hydrocarbon group containing from 1 to 6 carbon atoms, $A_2$ represents an alkylene group having from 1 to 6 carbon atoms, and q is 1, 2, 3 or 4.

According to one embodiment of the process, the mill diameter is in the range from 200 to 750 mm and the agitation unit is adjusted to a shaft speed of 150 to 400 rpm or the mill diameter is in the range from 751 to 1 250 mm and the agitation unit is adjusted to a shaft speed of 125 to 350 rpm or the mill diameter is in the range from 1 251 to 1 750 mm and the agitation unit is adjusted to a shaft speed of 100 to 300 rpm.

According to another embodiment of the process, the solid content, i.e. the content of the at least one crude mineral and/or pigment, of the aqueous suspension as provided in step II. is between 5.0 and 80.0 wt.-%, based on the total weight of the at least one crude mineral and/or pigment in the aqueous suspension as provided in step II., preferably between 10.0 and 75.0 wt.-%, based on the total weight of the at least one crude mineral and/or pigment in the aqueous suspension as provided in step II., more preferably between 20.0 and 70.0 wt.-%, based on the total weight of the at least one crude mineral and/or pigment in the aqueous suspension as provided in step II., and most preferably between 30.0 and 55.0 wt.-%, based on the total weight of the at least one crude mineral and/or pigment in the aqueous suspension as provided in step II. For a crude mineral and/or pigment having a weight median particle size in the range of 20.0 to 500.0 pm, the total weight of the at least one crude mineral and/or pigment in the aqueous suspension as provided in step II is preferably between 25.0 to 65.0 wt.-%. For a crude mineral and/or pigment having a weight median particle size in the range of 0.5 to 20.0 pm, the total weight of the at least one crude mineral and/or pigment in the aqueous suspension as provided in step II is preferably between 40.0 to 80.0 wt.-%.

According to yet another embodiment of the process, the at least one crude mineral and/or pigment provided in step I. is a crude white pigment containing material, wherein the white pigment is preferably selected from the group consisting of calcium carbonate-comprising materials, barite, aluminium oxide, titanium oxide and mixtures thereof, and is most preferably natural calcium carbonate, preferably the content of the white pigment in the crude white pigment containing material is from 0.1 to 99.9 wt.-%, based on dry weight, preferably from 30.0 to 99.7 wt.-%, based on the dry weight, more preferably from 60.0 to 99.3 wt.-%, based on the dry weight and most preferably from 80.0 to 99.0 wt.-%, based on the dry weight.

According to one embodiment of the process, the crude white pigment containing material comprises impurities selected from the group consisting of iron sulphides; iron oxides; silicates preferably a quartz, a mica, an amphibolite, a feldspar, a clay mineral and or mixtures thereof; graphite and mixtures thereof; and/or the weight ratio of white pigment to impurities in the crude white pigment containing material (white pigment: impurities) is from 0.1:99.9 to 99.9:0.1 based on the dry weight, preferably from 30:70 to 99.7:0.3 based on the dry weight, more preferably from 60:40 to 99.3:0.7 based on the dry weight, and most preferably from 80:20 to 99:1 based on the dry weight.

According to another embodiment of the process, one or more additives selected from the group consisting of pH-adjusting agents, solvents, and/or polyelectrolytes are added before step IV., preferably the content of these additives is in the range from 0.0005 to 1.0 wt.-%, based on the total weight of the at least one ground mineral and/or pigment in the aqueous suspension, more preferably from 0.001 to 0.5 wt.-%, based on the total weight of the at least one ground mineral and/or pigment in the aqueous suspension and most preferably in the range from 0.001 to 0.1, wt.-% based on the total weight of the at least one ground mineral and/or pigment in the aqueous suspension.

According to yet another embodiment of the process, the process further comprises the steps of
V. dewatering and optionally drying the ground mineral and/or pigment bearing phase obtained in step IV. to remove at least a portion of water to obtain a partially dewatered ground mineral and/or pigment or to obtain a dried ground mineral and/or pigment;
VI. treating the partially dewatered and/or dried ground mineral and/or pigment obtained after dewatering step V. with at least one dispersing agent and re-dilute it to obtain an aqueous suspension comprising a dispersed ground mineral and/or pigment, and/or
VII. treating the partially dewatered and/or dried ground mineral and/or pigment before or after dewatering or drying step V. with at least one saturated aliphatic linear or branched carboxylic acid and/or with at least one mono-substituted succinic anhydride and/or at least one mono-substituted succinic acid and/or salty reaction product(s) and/or with at least one phosphoric acid ester blend of one or more phosphoric acid mono-ester and/or reaction products thereof and one or more phosphoric acid di-ester and/or reaction products thereof to obtain a hydrophobized ground mineral and/or pigment.

According to a further aspect, the use of the ground mineral and/or pigment bearing phase obtainable by said process in paper applications is provided. According to a still further aspect, the use of the ground mineral and/or pigment bearing phase obtainable by said process in paper, plastics, paints, coatings, concrete, adhesives, sealants, food, feed, pharma, cement, cosmetic, water treatment and/or agriculture applications is provided, preferably in a wet end process of a paper machine, in cigarette paper, board, and/or coating applications, or as support for rotogravure and/or offset and/or ink jet printing and/or continuous ink jet printing and/or flexography and/or electrophotography and/or decoration surfaces. According to another aspect, the ground mineral and/or pigment bearing phase or the ground mineral and/or pigment obtainable by said process is provided.

The present invention will be described in the following with respect to particular embodiments and with reference to certain figures but the invention is not limited thereto but only by the claims. Terms as set forth hereinafter are generally to be understood in their common sense unless indicated otherwise.

BRIEF DESCRIPTION OF THE FIGURES

The accompanying figures show three illustrative preferred embodiments of the apparatus of the invention.

Figure 1:
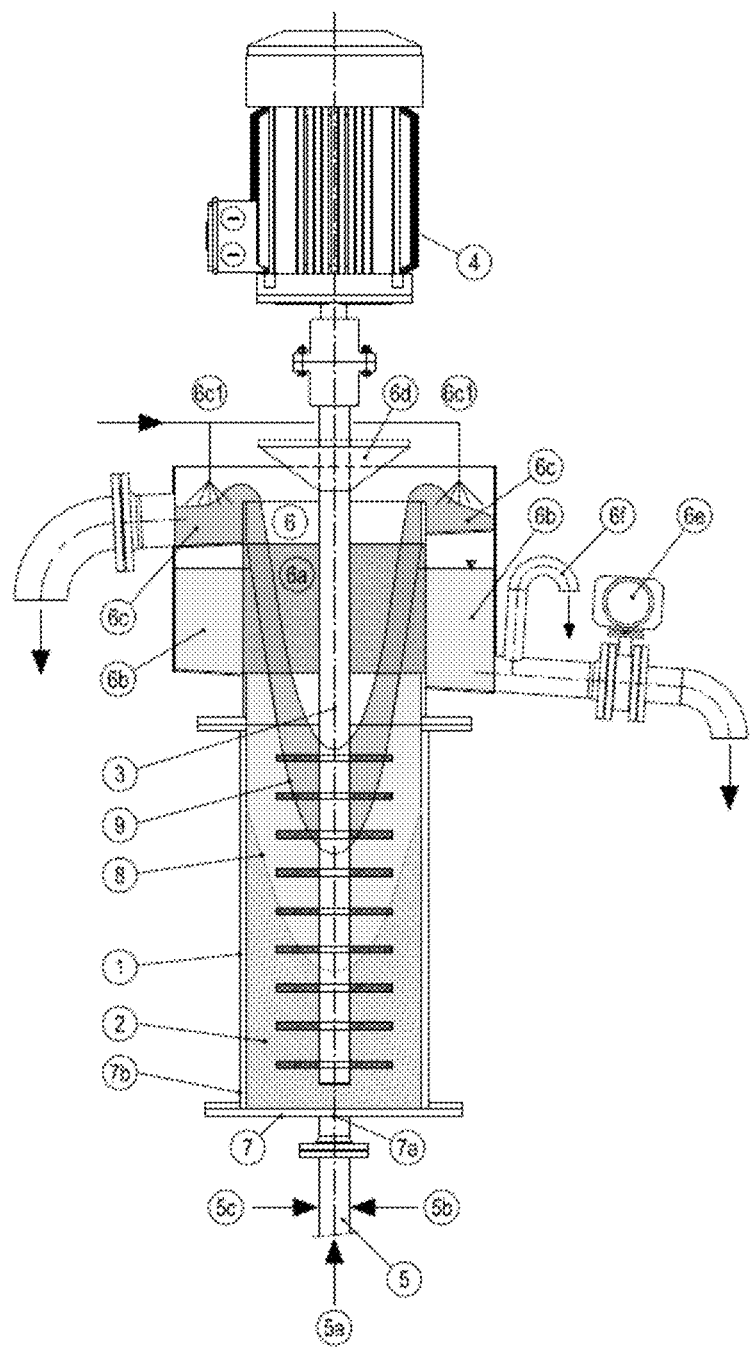
FIG. 1 is a longitudinal sectional view showing one embodiment of the apparatus in accordance with the invention of an apparatus for simultaneous grinding and froth flotation of at least one crude mineral and/or pigment. The apparatus further comprises an aqueous suspension vortex (8) as well as a froth vortex (9).

LIST OF REFERENCE SIGNS (1) vessel
(2) grinding media
(3) agitation unit
(4) drive
(5) charge system
(5*a*) crude mineral and/or pigment feed
(5*b*) collector agent feed
(5*c*) flotation gas inlet
(6) discharge system
(6*a*) sieve
(6*b*) product collecting zone
(6*c*) froth collecting zone
(6*d*) froth redirecting zone
(6*c*1) spraying nozzles
(6*e*) discharge control valve
(6*0f*) bypass with overflow (7) bottom
(7a) centre of the bottom
(7b) side of the bottom
(8) aqueous suspension vortex
(9) froth vortex The present invention is now described in more detail:

The Apparatus

Figure 2:
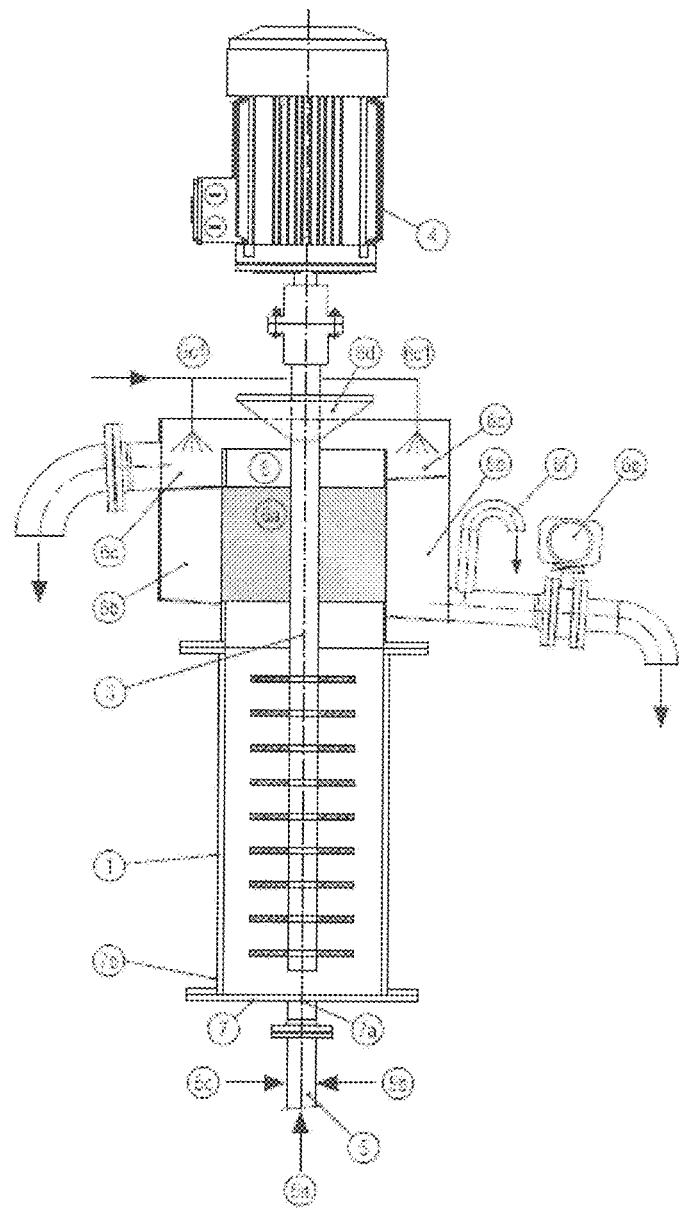
FIG. 2 is a longitudinal sectional view showing one embodiment of the apparatus in accordance with the invention of an apparatus for simultaneous grinding and froth flotation of at least one crude mineral and/or pigment.

The apparatus for simultaneous grinding and froth flotation of at least one crude mineral and/or pigment in accordance with FIGS. 1 and 2 comprises
a) a vessel (1) suitable for containing grinding media (2), a flotation gas, a collector agent and at least one crude mineral and/or pigment;
b) an agitation unit (3) rotatably mounted in vessel (1);
c) drive means (4) connected to agitation unit (3) for agitating the grinding media (2) and the at least one crude mineral and/or pigment to grind the at least one crude mineral and/or pigment into at least one ground mineral and/or pigment;
d) a charge system (5) connected to vessel (1) comprising
  i. a crude mineral and/or pigment feed (5a),
  ii. a collector agent feed (5b), and
  iii. a flotation gas inlet (5c);
e) a discharge system (6) connected to vessel (1) comprising
  i. a sieve (6a) suitable for separating the froth from the ground mineral and/or pigment,
  ii. a product collecting zone (6b) suitable for collecting the ground mineral and/or pigment,
  iii. a froth collecting zone (6c) and
  iv. a froth redirecting zone (6d).

The apparatus of the present invention is applicable to the simultaneous grinding and froth flotation of any crude mineral and/or pigment.

The term "crude" in the meaning of present invention refers to a material comprising the mineral and/or pigment and impurities.

The vessel (1) may be any kind of device well known to the man skilled in the art and typically used for agitating agitation means for transforming at least one crude mineral and/or pigment into at least one ground mineral and/or pigment and obtaining thereby a ground mineral and/or pigment bearing phase and a froth.

Thus, the vessel (1) suitable for containing grinding media (2), a flotation gas, a collector agent and at least one crude mineral and/or pigment is preferably a grinding vessel (1).

In one embodiment of the present invention, the vessel (1) is any kind of grinding vessel (1). For example, the vessel (1) may be any conventional grinding vessel in which refinement predominantly results from impacts with a secondary body, e.g., stirred ball mill, a centrifugal impact mill, an attrition mill, or other such equipment known to the skilled person.

The vessel (1) is preferably vertical. However, a horizontal vessel is also possible.

In one embodiment, the vessel (1) is a stirred ball mill. Additionally or alternatively, the vessel (1) has a grinding volume ranging from 1 l to 1 000 kl, wherein the diameter: height ratio is ranging from 1 to 100, preferably from 2 to 20, more preferably from 3 to 10.

It is to be noted that the inside of vessel (1) is preferably cylindrical. However, it is to be noted that the periphery of vessel (1) can be other than cylindrical, and can especially be of a conical or double-conical configuration.

In one embodiment, the temperature in vessel (1) is from 5 to 130° C. The choice of the temperature highly depends on the choice of the at least one collector agent. When for example tertiary amines are used as the at least one collector agent the temperature is preferably between 80 and 100° C. and more preferably between 85 and 95° C. When esterquats are used as the at least one collector agent the temperature is preferably between 20 and 50° C. and more preferably between 30 and 40° C.

The apparatus further comprises an agitation unit (3) rotatably mounted in vessel (1). Preferably, the agitation unit (3) is rotatably mounted in the centre of vessel (1) by means of suitable bearings. In one embodiment, the agitation unit (3) consists essentially of a stirring shaft on which preferably annular disks are mounted at uniform distances apart. The annular disks preferably have openings in their radially interior area for the escape of water vapour that may be formed.

The annular disks on the stirring shaft divide the vessel (1) into a number of sections or chambers which, however, are connected to one another at their radially outer area. The suspension of minerals and/or pigments to be ground must thus flow around these annular disks on a more or less meandering course from the inlet side to the outlet side, so that the intensity of the grinding action is at virtually the same level for all particles. In this manner a higher product quality is achieved.

Furthermore, a drive means (4) is provided. The drive means (4) is connected to agitation unit (3) for agitating the grinding media (2) and the at least one crude mineral and/or pigment to grind the at least one crude mineral and/or pigment into at least one ground mineral and/or pigment. Preferably, the drive means (4) is connected to the stirring shaft directly or preferably through a gear box, of agitation unit (3) for rotating or driving the stirring shaft.

The mineral and/or pigment to be ground is pumped into the apparatus through a charge system (5) which is stationary and reaches through a bore the way into the area of vessel (1). In one embodiment, the mineral and/or pigment to be ground is pumped into the apparatus through the charge system (5) via a suitable pump. Preferably, the necessary amount of grinding media (2) has previously been put into vessel (1).

The apparatus thus further comprises a charge system (5) connected to vessel (1). The charge system (5) comprises i. a crude mineral and/or pigment feed (5a), ii. a collector agent feed (5b), and iii. a flotation gas inlet (5c).

Preferably, the mineral and/or pigment feed (5a) is connected to the lower half, more preferably lower third and most preferably lower quarter, of vessel (1). In one embodiment of the present invention, the mineral and/or pigment feed (5a) is connected to the bottom (7) of vessel (1).

In one embodiment, the mineral and/or pigment feed (5a) is connected to the centre (7a) of the bottom (7). In an alternative embodiment, the mineral and/or pigment feed (5a) is connected to the side (7b) of the bottom (7), i.e. in the lower half, more preferably the lower third and most preferably the lower quarter. For example, the mineral and/or pigment feed (5a) is connected tangential to vessel (1).

Preferably, the crude mineral and/or pigment feed (5a), the collector agent feed (5b) and the flotation gas inlet (5c) of the charge system (5) are connected to each other such that the flotation gas, preferably air, and the collector agent are fed together with the at least one crude mineral and/or pigment in vessel (1). In this case, it is preferred that the charge system (5) is connected to the bottom (7) of vessel (1), preferably the lower half, more preferably lower third and most preferably lower quarter of vessel (1). Preferably, the charge system (5) is connected to the centre (7a) of the bottom (7). In an alternative embodiment, the charge system (5) is connected to the side (7b) of the bottom (7), i.e. in the lower half, more preferably the lower third and most preferably the lower quarter. For example, the charge system (5) is connected tangential to vessel (1).

Figure 3:
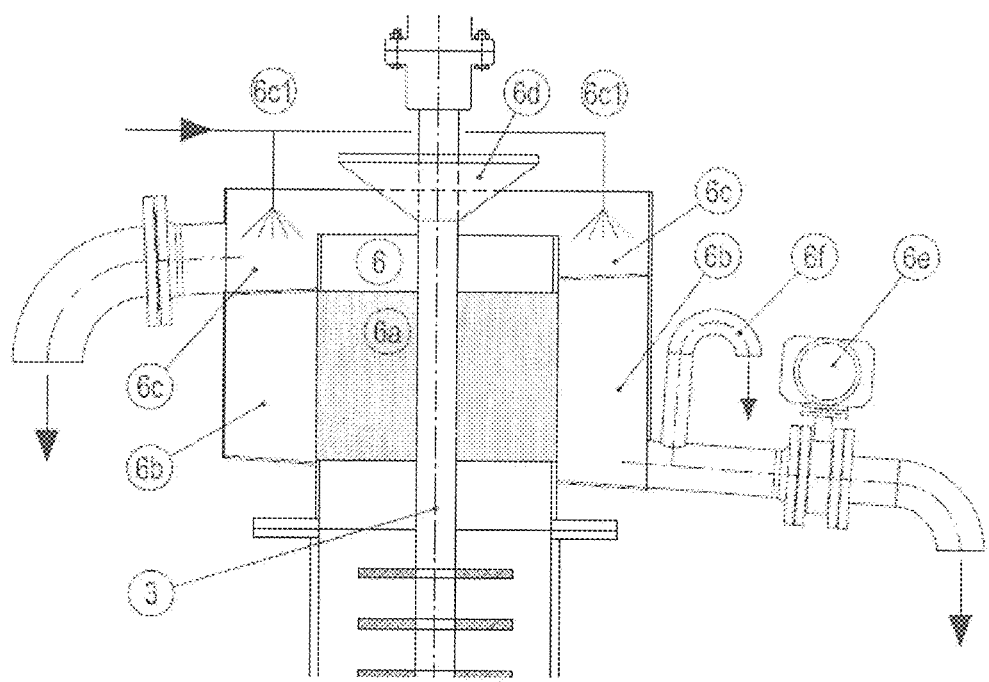
FIG. 3 is a longitudinal sectional view showing one embodiment of the discharge system (6) being connected to the vessel (1) of the apparatus for simultaneous grinding and froth flotation of at least one crude mineral and/or pigment.

At the opposite end of the apparatus, there is a discharge system (6) connected to vessel (1) (see also FIG. 3). The discharge system (6) comprises i. a sieve (6a), ii. a product collecting zone (6b) suitable for collecting the ground mineral and/or pigment, iii. a froth collecting zone (6c) and iv. a froth redirecting zone (6d).

It is one requirement of the instant invention that the sieve (6a) is suitable for separating the froth from the ground mineral and/or pigment.

Thus, the sieve (6a) may be any kind of device well known to the man skilled in the art and according to present invention is used for separating froth from ground minerals and/or pigments.

The sieve (6a) preferably has opening sizes in the range from 0.1 mm to 5.0 mm, more preferably in the range from 0.5 mm to 3.0 mm.

In one embodiment of the present invention, the sieve (6a) is any kind of sieve (6a). For example, the sieve (6a) may be any conventional sieve (6a), e.g. a screen, a mesh sieve, a sand metal sheet, or other such equipment known to the skilled person.

In one embodiment, the sieve (6a) is a vertical circumferential discharge screen being mounted on top of vessel (1), preferably centred on vessel (1).

As already mentioned, the sieve (6a) separates the froth from the ground minerals and/or pigments. Furthermore, the sieve (6a) prevents that the grinding media is discharged to the ground mineral and/or pigment. It is appreciated that the sieve (6a) is adjusted such that the ground mineral and/or pigment is directed to a product collecting zone (6b) and the froth is directed to a froth collecting zone (6c).

Thus, the discharge system (6) further comprises a product collecting zone (6b) being suitable for collecting the ground mineral and/or pigment.

It is appreciated that the product collecting zone (6b) is connected to sieve (6a).

Preferably, the product collecting zone (6b) is ring-shaped.

In one embodiment of the present invention, the product collecting zone (6b), preferably the ring-shaped product collecting zone (6b), is arranged around the circumference of sieve (6a).

Thus, the diameter of the product collecting zone (6b), preferably the ring-shaped product collecting zone (6b), is at each point of the product collecting zone (6b) higher than the diameter of sieve (6a).

Further, the discharge system (6) comprises a froth collecting zone (6c) being suitable for collecting the froth.

It is appreciated that the froth collecting zone (6c) is connected to sieve (6a) and/or product collecting zone (6b). In one embodiment, the froth collecting zone (6c) is connected to sieve (6a) and product collecting zone (6b).

Preferably, the froth collecting zone (6c) is ring-shaped.

In one embodiment of the present invention, the froth collecting zone (6c), preferably the ring-shaped froth collecting zone (6c), is arranged on top of sieve (6a) and product collecting zone (6b).

If the product collecting zone (6b) and the froth collecting zone (6c) are ring-shaped, the ring-shaped product collecting zone (6b) and the ring-shaped froth collecting zone (6c) are preferably of the same circumference.

In one embodiment of the present invention, the froth collecting zone (6c) comprises spraying nozzles (6c1). Preferably, the froth collecting zone (6c) comprises at least two spraying nozzles (6c1), more preferably at least three spraying nozzles (6c1). In one embodiment, the froth collecting zone (6c) comprises two or three spraying nozzles (6c1). The spraying nozzles (6c1) are especially suitable for wetting the collected froth with water for reducing its volume and transporting the froth out of the froth collecting zone (6c).

The discharge system (6) further comprises a froth redirecting zone (6d). It is appreciated that the froth collected in the froth collecting zone (6c) can be redirected through agitation unit (3).

Thus, the froth redirecting zone (6d) is preferably arranged on top of sieve (6a) and product collecting zone (6b). Additionally or alternatively, the froth redirecting zone (6d) is arranged around the circumference of the stirring shaft of agitation unit (3).

Preferably, the froth redirecting zone (6d) is ring-shaped.

For discharging the ground mineral and/or pigment bearing phase collected in product collecting zone (6b), the discharge system (6) may further comprises a discharge control valve (6e) or a bypass with overflow (6f). Preferably, the discharge system (6) comprises a bypass with overflow (6f).

In addition to the agitation unit (3), the vessel (1) further comprises grinding media (2). As grinding media (2), the vessel (1) can comprise any kind of grinding means known to the skilled person and typically used for grinding, e.g. wet grinding, minerals and/or pigments.

In particular, any kind of grinding media is suitable that is wear resistant under typical conditions used for wet grinding, especially under neutral to alkaline conditions (more precisely at a pH of 6 or above, preferably at a pH between 6 and 13 and more preferably at a pH between 6 and 11) and/or at temperatures above 5° C. (more precisely at a temperature between 5 and 130° C.). The choice of the temperature highly depends on the choice of the at least one collector agent. When for example tertiary amines are used as the at least one collector agent the temperature is preferably between 80 and 100° C. and more preferably between 85 and 95° C. When esterquats are used as the at least one collector agent the temperature is preferably between 20 and 50° C. and more preferably between 30 and 40° C.

In one embodiment of the present invention, the grinding media (2) are moving beads, preferably moving beads of regular shape. In this regard, it is appreciated that the grinding media being present in the vessel (1) have a weight median particle diameter $d_{50}$ of from 0.2 μm to 5.0 pm and/or a bulk density in the range from 1.5 to 6.0 kg/dm³. For example, the grinding media (2) being present in the vessel (1) have a weight median particle diameter $d_{50}$ of from 1.0 mm to 4.5 mm and a bulk density in the range from 2.0 to 5.0 kg/dm³ for a crude mineral and/or pigment having a weight median diameter $d_{50}$ in the range from 20.0 to 500.0 μm or the grinding media (2) being present in the vessel (1) have a weight median particle diameter $d_{50}$ of from 2.4 mm to 4.0 mm and a bulk density in the range from 2.2 to 4.0 kg/dm³ for a crude mineral and/or pigment having a weight median diameter $d_{50}$ in the range from 20.0 to 500.0 μm. Alternatively, the grinding media (2) being present in the vessel (1) have a weight median particle diameter $d_{50}$ of from 0.3 mm to 4.0 mm and a bulk density in the range from 2.0 to 4.5 kg/dm³ for a crude mineral and/or pigment having a weight median diameter $d_{50}$ in the range from 0.5 to 20.0 pm or the grinding media (2) being present in the vessel (1)

have a weight median particle diameter $d_{50}$ of from 0.4 mm to 3.0 mm and a bulk density in the range from 2.5 to 3.0 kg/dm$^3$ for a crude mineral and/or pigment having a weight median diameter $d_{50}$ in the range from 0.5 to 20.0 μm.

In one embodiment, the instant apparatus can be used for grinding and froth flotation of at least one crude mineral and/or pigment having a broad particle size distribution, e.g. a weight median particle diameter $d_{50}$ in the range from 20.0 to 500.0 μm. In this case, the at least one crude mineral and/or pigment to be ground in the instant apparatus having a weight median particle diameter $d_{50}$ in the range from 20.0 to 500.0 μm is preferably used in combination with grinding media (2) having a bulk density in the range from 1.5 to 6.0 kg/dm$^3$, preferably in the range from 2.0 to 5.0 kg/dm$^3$ and more preferably in the range from 2.2 to 4.0 kg/dm$^3$. Additionally or alternatively, the grinding media (2) have a weight median particle diameter $d_{50}$ in the range from 0.2 to 5.0 mm, preferably in the range from 1.0 to 4.5 mm and more preferably in the range from 2.4 to 4.0 mm.

In an alternative embodiment, the instant apparatus can be used for grinding and froth flotation of at least one crude mineral and/or pigment having a small particle size distribution, e.g. a weight median particle diameter $d_{50}$ in the range from 0.5 to 20.0 μm. In this case, the at least one crude mineral and/or pigment to be ground in the instant apparatus having a weight median particle diameter $d_{50}$ in the range from 0.5 to 20.0 μm is preferably used in combination with grinding media (2) having a bulk density in the range from 1.5 to 6.0 kg/dm$^3$, preferably in the range from 2.0 to 4.5 kg/dm$^3$ and more preferably in the range from 2.5 to 3.0 kg/dm$^3$. Additionally or alternatively, the grinding media (2) have a weight median particle diameter $d_{50}$ in the range from 0.2 to 5.0 mm, preferably in the range from 0.3 to 4.0 mm and more preferably in the range from 0.4 to 3.0 mm.

Throughout the present application, the particle diameter of a material is described by its distribution of particle sizes. The value $d_x$ represents the diameter relative to which x % by weight of the particles have diameters less than $d_x$. This means that the $d_{20}$ value is the particle size at which 20 wt.-% of all particles are smaller, and the $d_{75}$ value is the particle size at which 75 wt.-% of all particles are smaller. The $d_{50}$ value is thus the weight median particle diameter at which 50 wt.-% of all grains are bigger whilst the remaining 50 wt.-% are smaller than this particle diameter. The $d_{98}$ value (also referred to as the "topcut") is the particle diameter at which 98 wt.-% of all particles are smaller than the indicated value. For the purpose of the present invention the particle size is specified as weight median particle diameter $d_{50}$ unless indicated otherwise. Unless indicated otherwise, the particle diameter of a material is measured by using a CILAS 920 particle-size-analyser of CILAS, Orleans, France. The particle size distribution is determined in volume-% (vol.-%), but for materials which have a constant density throughout the particle size range, wt.-% and vol.-% are equivalent.

The grinding media (2) are preferably made of a material differing from the ground mineral and/or pigment. In this case, the material of the grinding media (2) may be selected independently from the material of the ground mineral and/or pigment.

Accordingly, it is appreciated that the grinding media (2) are made of a material selected from the group comprising quartz sand, glass, porcelain, zirconium oxide, zirconium silicate, iron, stainless steel and mixtures thereof, optionally comprising minor quantities of further minerals.

Process Carried Out in the Apparatus

The inventors surprisingly found that the process of the present invention carried out in the apparatus according to the instant invention provides the efficient separation of minerals and/or pigments and impurities and thus a high mineral and/or pigment recovery.

Thus, a process carried out in the instant apparatus for manufacturing at least one ground mineral and/or pigment is provided. The process comprises the steps of I. providing at least one crude mineral and/or pigment, grinding media (2) and a collector agent in vessel (1);

II. mixing the at least one crude mineral and/or pigment, the grinding media (2) and the collector agent as provided in step I. with water to form an aqueous suspension;

III. passing a flotation gas through flotation gas inlet (5c) into the aqueous suspension formed in step II. and agitating the obtained aqueous suspension by using agitation unit (3) to transform the at least one crude mineral and/or pigment into at least one ground mineral and/or pigment and obtaining thereby a ground mineral and/or pigment bearing phase and a froth;

IV. recovering the at least one ground mineral and/or pigment by removing the ground mineral and/or pigment bearing phase from the froth obtained in step III.

With regard to the definition of the apparatus and preferred embodiments thereof, reference is made to the statements provided above when discussing the technical details of the apparatus of the present invention.

Step I. of the instant process requires the provision of at least one crude mineral and/or pigment, grinding media (2) and a collector agent in vessel (1).

The term "at least one" crude mineral and/or pigment in the meaning of the present invention means that the crude mineral and/or pigment comprises, preferably consists of, one or more crude minerals and/or pigments.

In one embodiment of the present invention, the at least one crude mineral and/or pigment comprises, preferably consists of, one crude mineral or pigment. Alternatively, the at least one crude mineral and/or pigment comprises, preferably consists of, two or more crude minerals and/or pigments. For example, the at least one crude mineral and/or pigment comprises, preferably consists of, two or three crude minerals and/or pigments.

Preferably, the at least one crude mineral and/or pigment comprises, more preferably consists of, one crude mineral or pigment.

In one embodiment, at least one crude mineral and/or pigment provided in step I. is a crude white pigment containing material. Preferably, the white pigment is selected from the group consisting of calcium carbonate-comprising materials, barite, aluminium oxide, titanium oxide and mixtures thereof, and is most preferably natural calcium carbonate.

The term "calcium carbonate-comprising material" refers to a material comprising at least 50.0 wt.-% calcium carbonate, based on the total dry weight of the calcium carbonate-comprising material.

The calcium carbonate-comprising materials may be natural calcium carbonate or a mixture of calcium carbonate and magnesium carbonate.

Calcium magnesium carbonates are, for example, dolomite.

The natural calcium carbonate may feature, e.g. one or more of marble, limestone and/or chalk, more preferably marble.

In one embodiment, the crude white pigment containing material comprises a mixture of calcium carbonate and dolomite.

In one embodiment, the content of the white pigment in the crude white pigment containing material is from 0.1 to 99.9 wt.-%, preferably from 30.0 to 99.7 wt.-%, more preferably from 60.0 to 99.3 wt.-%, and most preferably from 80.0 to 99.0 wt.-%, based on the dry weight, preferably based on the total dry weight of the crude white pigment containing material.

In addition to the white pigment, the crude white pigment containing material comprises impurities selected from the group consisting of iron sulphides; iron oxides; silicates preferably a quartz, a mica, an amphibolite, an feldspar, a clay mineral and or mixtures thereof; graphite and mixtures thereof.

Additionally or alternatively, the crude white pigment containing material comprises the white pigment to impurities in a specific weight ratio.

For example, the weight ratio of white pigment to impurities in the crude white pigment containing material (white pigment : impurities) is from 0.1:99.9 to 99.9:0.1, preferably from 30:70 to 99.7:0.3, more preferably from 60:40 to 99.3:0.7, and most preferably from 80:20 to 99:1, based on the dry weight.

The at least one crude mineral and/or pigment may have a large particle size distribution, e.g. a weight median particle diameter $d_{50}$ in the range from 20.0 to 500.0 µm. In one embodiment, the at least one crude mineral and/or pigment has a small particle size distribution, e.g. a weight median particle diameter $d_{50}$ in the range from 0.5 to 20.0 µm.

The most common methods for separating minerals and/or pigments, such as calcium carbonate, and impurities from one another involve physical separations whereby the crude mineral and/or pigment is first ground and then subjected to froth flotation in an aqueous environment by employing a means which selectively imparts hydrophobicity to the impurity fractions of the ground material to enable such components to be floated by association with a gas. Another method selectively imparts hydrophobicity to mineral and/or pigment-fractions of the ground material to enable such components to be floated and/or collected by a gas. In the present invention, the mineral and/or pigment and impurity fractions are separated by floating the impurity fraction, which is then collected, and recovering the non-floated ground mineral and/or pigment fraction of the mineral and/or pigment material.

The process of present invention allows flotation of freshly formed surfaces, this means flotation of the impurities occurs directly after their exposure. The impurities are transported immediately out of the grinding zone and migrate into the froth vortex. Unwanted comminution of the impurities which would result in the consumption of larger amounts of collector agents in view of bigger surfaces is avoided. Of course the apparatus according to the present invention is also suitable for carrying out grinding and flotation consecutive or for carrying out only one of these steps. These alternative processes do not achieve above-mentioned benefits.

The at least one collector agent used for imparting hydrophobicity to the impurity fractions may be any means known to the skilled person.

The term "at least one" collector agent in the meaning of the present invention means that the collector agent comprises, preferably consists of, one or more collector agents.

In one embodiment of the present invention, the at least one collector agent comprises, preferably consists of, one collector agent. Alternatively, the at least one collector agent comprises, preferably consists of, two or more collector agents. For example, the at least one collector agent comprises, preferably consists of, two or three collector agents.

Preferably, the at least one collector agent comprises, more preferably consists of, one collector agent.

For example, the at least one collector agent is selected from the group consisting of surface active and hydrophobic tensides, preferably xanthate or thio phosphates; oleic acids, alkyl sulphates, polyalkylenimines, primary amines, tertiary amines, quaternary amines, fatty amines, esterquats, polyesterquats, imidazolines or quaternary imidazolium compounds preferably quaternary imidazolium methosulphates, or compounds of formula (1) and (2) as defined above and/or mixtures thereof. Preferably the at least one collector agent is selected from esterquats and tertiary amines. In one embodiment, the at least one collector agent is non-ionic.

According to step II. of the instant process, the at least one crude mineral and/or pigment, the grinding media (2) and the at least one collector agent as provided in step I. are mixed with water to form an aqueous suspension.

The aqueous suspension formed in step II. preferably has a pH of between 7 and 10.

Preferably, the grinding media (2) have previously been put into vessel (1).

In one embodiment, said at least one crude mineral and/or pigment is in a dry state and is contacted with said at least one collector agent prior forming the aqueous suspension (no, first formation of pigment slurry and subsequent addition of collector agent is preferred). Thus, an aqueous suspension of said at least one crude mineral and/or pigment and said at least one collector agent is charged into vessel (1) to the grinding media (2).

In an alternative embodiment, said at least one crude mineral and/or pigment is first introduced in an aqueous environment, and said at least one collector agent is added thereafter to this aqueous environment to form said aqueous suspension. Thus, an aqueous suspension of said at least one crude mineral and/or pigment is first charged into vessel (1) to the grinding media (2) followed by said at least one collector agent.

In another alternative embodiment, said at least one collector agent is first introduced in an aqueous environment, and said at least one crude mineral and/or pigment is added thereafter to this aqueous environment to form said aqueous suspension. Thus, an aqueous suspension of said at least one collector agent is first charged into vessel (1) to the grinding media (2) followed by said at least one crude mineral and/or pigment.

The solid content, i.e. the content of the at least one crude mineral and/or pigment, of the aqueous suspension as provided in step II. is preferably between 5.0 and 80.0 wt.-%, preferably between 10.0 and 75.0 wt.-%, more preferably between 20.0 and 70.0 wt.-%, and most preferably between 25.0 and 45.0 wt.-%, based on the total weight of the at least one crude mineral and/or pigment in the aqueous suspension as provided in step II. For a crude mineral and/or pigment having a weight median particle size in the range of 20.0 to 500.0 µm, the total weight of the at least one crude mineral and/or pigment in the aqueous suspension as provided in step II. is preferably between 25.0 to 65.0 wt.-%. For a crude mineral and/or pigment having a weight median particle size in the range of 0.5 to 20.0 µm, the total weight of the at least one crude mineral and/or pigment in the aqueous suspension as provided in step II. is preferably between 40.0 to 80.0 wt.-%.

Additionally or alternatively, the content of the at least one collector agent is in the range from 0.001 to 5.0 wt.-%, preferably from 0.05 to 0.8 wt.-% and most preferably in the range from 0.02 to 0.1 wt.-%, based on the total weight of the at least one crude mineral and/or pigment in the aqueous suspension as provided in step II.

Preferably, the aqueous suspension formed in step II. is formed under agitation.

According to step III. of the instant process, a flotation gas is passed through flotation gas inlet (5c) into the aqueous suspension formed in step II. Furthermore, the obtained aqueous suspension is agitated by using agitation unit (3) to transform the at least one crude mineral and/or pigment into at least one ground mineral and/or pigment and obtaining thereby a ground mineral and/or pigment bearing phase and a froth.

Said flotation gas is generally introduced in the vessel of step III. via flotation gas inlet (5c) of the charge system (5) which is connected to vessel (1). Preferably, the charge system (5), i.e. also the flotation gas inlet (5c), is connected to the bottom (7) of vessel (1) such that said flotation gas then naturally rises upwards through the aqueous suspension.

Said flotation gas is preferably air.

It is preferred that the flotation gas feature a bubble size in the suspension of between 0.01 and 10.0 mm.

The gas hold up is preferably between 5 to 35%.

During step III., the aqueous suspension preferably has a temperature of between 5 and 130 ° C., more preferably of between 10 and 100 ° C., even more preferably of between 15 and 95 ° C. and most preferably of between 20 and 95 ° C. The choice of the temperature highly depends on the choice of the at least one collector agent. When for example tertiary amines are used as the at least one collector agent, the temperature is preferably between 80 and 100° C. and more preferably between 85 and 95° C. When esterquats are used as the at least one collector agent, the temperature is preferably between 20 and 50° C. and more preferably between 30 and 40° C.

Step III. is preferably performed under agitation.

Step III. may be continuous or discontinuous.

In one embodiment, at least one dispersing agent is added before or during step III. Additionally or alternatively, the at least one crude mineral and/or pigment comprises at least one dispersing agent, i.e. the at least one dispersing agent is provided together with the at least one crude mineral and/or pigment in process step I. Preferably, the at least one dispersing agent is added before or during step III., more preferably during step III.

The at least one dispersing agent may be any dispersing agent known to the skilled person.

The term "at least one" dispersing agent in the meaning of the present invention means that the dispersing agent comprises, preferably consists of, one or more dispersing agent.

In one embodiment of the present invention, the at least one dispersing agent comprises, preferably consists of, one dispersing agent. Alternatively, the at least one dispersing agent comprises, preferably consists of, two or more dispersing agents. For example, the at least one dispersing agent comprises, preferably consists of, two or three dispersing agents.

Preferably, the at least one dispersing agent comprises, more preferably consists of, one dispersing agent.

For example, the at least one dispersing agent is selected from the group consisting of sodium, potassium, calcium, magnesium, lithium, strontium, primary amine, secondary amine, tertiary amine and/or ammonium salts, whereby the amine salts are linear or cyclic, of at least partly neutralized homopolymers or copolymers of (meth)acrylic acid, maleic acid, fumaric acid, itaconic acid and derivatives of these acids, preferably esters or amides such as methylmethacrylate, methylacrylate, acrylamide, sodium hydrogen phosphate or polyphosphates such as alkalipolyphosphates, carboxymethylcellulose, steric dispersants, comb polymers and/or mixtures thereof, preferably sodium polyacrylate having a molecular weight $M_w$ of from 4 000 to 10 000 g/mol, preferably from 4 000 to 8 000 g/mol and most preferably of about 6 000 g/mol and/or mixtures thereof.

Preferably, the at least one dispersing agent is sodium polyacrylate having a molecular weight $M_w$ of from 4 000 to 10 000 g/mol, preferably from 4 000 to 8 000 g/mol and most preferably of about 6 000 g/mol.

When a dispersing agent is used in the process according to present invention it is preferred that no flocculation occurs with the collector agent.

In one embodiment, the solid content, i.e. the content of the at least one crude mineral and/or pigment, in the aqueous suspension as provided in step II. is between 60.0 and 80.0 wt.-% and the at least one dispersing agent is negatively charged and the at least one collector agent is non-ionic. Alternatively, the at least one dispersing agent is positively charged and the at least one collector agent is non-ionic or the at least one dispersing agent is non-ionic and the at least one collector agent is negatively or positively charged or the collector agent and the dispersing agent are non-ionic.

A preferred combination of collector and dispersing agent are tertiary amines and polyacrylic acids.

The content of the at least one dispersing agent is preferably in the range from 0.1 to 1.0 wt.-%, more preferably from 0.2 to 0.6 wt.-% and most preferably in the range from 0.3 to 0.5 wt.-% based on the total weight of the at least one crude mineral and/or pigment in the aqueous suspension, preferably based on the total weight of the at least one crude mineral and/or pigment in the aqueous suspension as provided in step II.

If a dispersing agent is added, the content of the at least one collector agent is preferably in the range from 0.001 to 5.0 wt.-%, preferably from 0.05 to 0.8 wt.-%, and most preferably in the range from 0.02 to 0.1 wt.-%, based on the total weight of the at least one crude mineral and/or pigment in the aqueous suspension as formed in step II.

It is appreciated that the process involves a direct or an indirect flotation step leading to the formation of a froth containing the floated phase and a slurry bearing phase with the remaining ground mineral and/or pigment. Preferably, the process involves an indirect flotation step leading to the formation of a froth containing the floated phase and a slurry bearing phase with the remaining ground mineral and/or pigment.

It is preferred that the mill diameter, i.e. the inner diameter of vessel (1), is in the range from 200 to 750 mm and the agitation unit is adjusted to a shaft speed of 150 to 400 rpm or the mill diameter, i.e. the inner diameter of vessel (1), is in the range from 751 to 1 250 mm and the agitation unit (3) is adjusted to a shaft speed of 125 to 350 rpm or the mill diameter is in the range from 1 251 to 1 750 mm and the agitation unit is adjusted to a shaft speed of 100 to 300 rpm.

In one embodiment, one or more additives selected from the group consisting of pH-adjusting agents, solvents, and/or polyelectrolytes are added before step IV. preferably the content of these additives is in the range from 0.0005 to 1.0 wt.-%, more preferably from 0.001 to 0.5 wt.-% and most preferably in the range from 0.001 to 0.1 wt.-% based on the total weight of the at least one ground mineral and/or pigment in the aqueous suspension, preferably based on the total weight of the at least one ground mineral and/or pigment in the ground mineral and/or pigment bearing phase of step III.

According to step IV., the at least one ground mineral and/or pigment is recovered by removing the ground mineral and/or pigment bearing phase from the froth obtained in step III.

The froth containing impurities is upheld within the aqueous suspension and concentrated in a supernatant foam. This foam can be collected and separated from the at least one mineral and/or pigment by the discharge system (6) connected to vessel (1).

The collected froth comprising the impurities may be subjected to one or more further steps of froth flotation.

Likewise, the collected ground mineral and/or pigment bearing phase obtained in step IV. may be subjected to one or more further steps of froth flotation, according to the invention or according to prior art froth flotation methods.

Thus, it is appreciated that a ground mineral and/or pigment bearing phase is obtainable by the instant process.

The obtained ground mineral and/or pigment bearing phase obtained by the process of the present invention can be dewatered by removing at least a portion of the water to obtain a partially dewatered ground mineral and/or pigment. Thus, the instant process may further comprise step V. of dewatering and optionally drying the ground mineral and/or pigment bearing phase obtained in step IV.

The solids content of the partially dewatered ground mineral and/or pigment is preferably from 20.0 to 80.0 wt.-%, more preferably from 30.0 to 70.0 wt.-%, most preferably from 40 to 65.0 wt.-%, based on the total weight of the corresponding ground mineral and/or pigment bearing phase. According to one embodiment, the solids content of the corresponding ground mineral and/or pigment bearing phase is dewatered to a medium solid content so that it is from 50.0 to 62.0 wt.-%, based on the total weight of the corresponding ground mineral and/or pigment bearing phase. It is appreciated that the solids content of the partially dewatered ground mineral and/or pigment is above the solids content of the corresponding ground mineral and/or pigment bearing phase before dewatering. Thus, the solids content of the partially dewatered ground mineral and/or pigment depends on the solids content of the corresponding ground mineral and/or pigment bearing phase before dewatering.

According to one optional embodiment of the present invention, the step of dewatering the corresponding ground mineral and/or pigment bearing phase obtained by the process of the present invention is carried out such that a dry product is obtained, i.e. the corresponding ground mineral and/or pigment bearing phase is dried to obtain a dried ground mineral and/or pigment.

In another embodiment of the instant process, the process further comprises step VI. of treating the partially dewatered and/or dried ground mineral and/or pigment obtained after dewatering step V. with at least one dispersing agent and re-dilute it to obtain an aqueous suspension comprising a dispersed ground mineral and/or pigment.

Additionally or alternatively, the process further comprises step VII. of treating the partially dewatered and/or dried ground mineral and/or pigment before or after dewatering or drying step V. with at least one saturated aliphatic linear or branched carboxylic acid and/or with at least one mono-substituted succinic anhydride and/or at least one mono-substituted succinic acid and/or salty reaction product(s) and/or with at least one phosphoric acid ester blend of one or more phosphoric acid mono-ester and/or reaction products thereof and one or more phosphoric acid di-ester and/or reaction products thereof to obtain a hydrophobized ground mineral and/or pigment.

The methods for treating a partially dewatered and/or dried ground mineral and/or pigment with at least one mono-substituted succinic anhydride and/or at least one mono-substituted succinic acid and/or salty reaction product(s) and/or with at least one phosphoric acid ester blend of one or more phosphoric acid mono-ester and/or reaction products thereof and one or more phosphoric acid di-ester and/or reaction products thereof and suitable compounds for coating are described in EP 2 722 368 A1 and EP 2 770 017 A1, which are thus incorporated herewith by references.

Suitable saturated aliphatic linear or branched carboxylic acids for treating the dried ground mineral and/or pigment and/or partially dewatered ground mineral and/or pigment are for example aliphatic linear or branched carboxylic acids having between 5 and 24 carbon atoms during and/or before and/or after drying. Preferably, the dried ground mineral and/or pigment and/or partially dewatered ground mineral and/or pigment is treated with an aliphatic linear or branched carboxylic acid having between 5 and 24 carbon atoms before or after drying. More preferably, the dried ground mineral and/or pigment and/or partially dewatered ground mineral and/or pigment is treated with an aliphatic linear or branched carboxylic acid having between 5 and 24 carbon atoms before drying.

The aliphatic linear or branched carboxylic acid in the meaning of the present invention may be selected from one or more straight chain, branched chain, saturated, unsaturated and/or alicyclic carboxylic acids. Preferably, the aliphatic linear or branched carboxylic acid is a monocarboxylic acid, i.e. the aliphatic linear or branched carboxylic acid is characterized in that a single carboxyl group is present. Said carboxyl group is placed at the end of the carbon skeleton.

In one embodiment of the present invention, the aliphatic linear or branched carboxylic acid is selected from saturated unbranched carboxylic acids, that is to say the aliphatic linear or branched carboxylic acid is preferably selected from the group of carboxylic acids consisting of pentanoic acid, hexanoic acid, heptanoic acid, octanoic acid, nonanoic acid, decanoic acid, undecanoic acid, lauric acid, tridecanoic acid, myristic acid, pentadecanoic acid, palmitic acid, heptadecanoic acid, stearic acid, nonadecanoic acid, arachidic acid, heneicosylic acid, behenic acid, tricosylic acid, lignoceric acid and mixtures thereof.

In another embodiment of the present invention, the aliphatic linear or branched carboxylic acid is selected from the group consisting of octanoic acid, decanoic acid, lauric acid, myristic acid, palmitic acid, stearic acid, arachidic acid and mixtures thereof. Preferably, the aliphatic linear or branched carboxylic acid is selected from the group consisting of myristic acid, palmitic acid, stearic acid and mixtures thereof.

For example, the aliphatic linear or branched carboxylic acid is stearic acid.

In view of the advantageous properties of the instant apparatus and process, especially the efficient separation of minerals and/or pigments and impurities and the high mineral and/or pigment recovery resulting therefrom, the present invention is further directed to the ground mineral and/or pigment and/or the ground mineral and/or pigment bearing phase obtainable by the instant process.

In a preferred embodiment, the mineral and/or pigment obtained according to the inventive process comprises <2 wt.-%, preferably <0.5 wt.-% and more preferably <0.05 wt.-% impurities determined as described in the Experimental Section.

In a further embodiment the Tappi Brighness determined as described in the Experimental Section of a white pigment manufactured by the process according to present invention is >85, preferably >87 and more preferably >94 for fine ground materials, this means particles with a $d_{50}$ of 0.5 to 20.0 μm.

The inventive ground mineral and/or pigment bearing phase obtainable by the process may be used in paper applications. The inventive ground mineral and/or pigment bearing phase obtainable by the process may also be used in paper, plastics, paints, coatings, adhesives, sealants, food, feed, pharma, concrete, cement, cosmetic, water treatment and/or agriculture applications, The inventive ground mineral and/or pigment bearing phase obtainable by the process may advantageously be used in wet end process of paper machine, in cigarette paper, board, and/or coating applications. Alternatively, the inventive ground mineral and/or pigment bearing phase obtainable by the process may advantageously be used as support for rotogravure and/or offset and/or ink jet printing and/or continuous ink jet printing and/or flexography and/or electrophotography and/or decoration surfaces.

The following figures, examples and tests will illustrate the present invention, but are not intended to limit the invention in any way.

EXPERIMENTAL SECTION

1. Measurement Methods

Particle Size Distribution

The average particle size and the average particle size mass distribution of a particulate material are determined via laser diffraction, i.e. the light from a laser passes through a suspension and the particle size distribution is calculated from the resulting diffraction pattern. The measurement is made with a CILAS 920 particle-size-analyzer of CILAS, Orleans, France. The method is well known to the skilled person and is commonly used to determine the particle size distribution of particulate materials. The measurement is carried out by diluting the corresponding suspension (de-ionised water; solution of 0.1 wt.-% of sodium pyrophosphate). The samples were dispersed using a high speed stirrer and ultrasonic.

Weight Solids (wt.-%) of a Material in Suspension

The weight solids were determined by dividing the weight of the solid material by the total weight of the aqueous suspension. The weight of the solid material is determined by weighing the solid material obtained by evaporating the aqueous phase of suspension and drying the obtained material to a constant weight.

Determination of the HCl Insoluble Content 10 g crude material (dry product or slurry under consideration of the solid content) were weighted into a 400 ml beaker, suspended in 50 ml demineralized (demin.) water and mixed with 40 ml HCl (8N=25%). After the formation of carbon dioxide has been finished the mixture was boiled for 5 minutes, cooled to room temperature and subsequently strained over a previously weighed membrane filter. The beaker wall was rinsed 3 times with 20 ml demin. water and afterwards the filter was dried at 105° C. in the microwave until weight constancy is reached. After the filter cooled down in the desiccator it was weighed back and the HCl insoluble (insol.) content was calculated according to following equation:

$$\text{HCl-insol. content[\% by weight]} = \frac{\text{filter gross[g]} - \text{filter tare[g]}}{\text{weighted sample[g](dry mass of slurry)}} \times 100\%$$

Product Residues (Sieving Analysis)

Sieving analysis was carried out according to ISO 3310.

Brightness Measurement and Yellow Index (=YI)

The samples from the flotation process were dried by use of microwave. The obtained dry powders were prepared in a powder press to get a flat surface and Tappi brightness (R457 ISO brightness) is measured according to ISO 2469 using an ELREPHO 3000 from the company Datacolor. The results for the Tappi brightness are given as percentage in comparison to a calibration standard.

The yellow index has been calculated by the following formula:

$$YI = 100 * (R_x - R_z)/R_y$$

2. Collector and Dispersing Agents, Impurities and Crude MaterialL 2.1 Collector Agents A: Lupromin® FP 18 AS Mixture of fatty acids, C14-C20 and C16-C18 unsaturated products with adipic acid and triethanolamine, di-Me sulphate-quaternized and 2-propanol, commercially available from BASF SE (Germany).

B: Lilaflot 1590

Mixture of a Quaternary ammonium compound and an Alkylamine ethoxylate, commercially available from Akzo Nobel Surface Chemistry AB, (Sweden)

C: Lilaflot GS13

Mixture of 2-Ethylhexanol and hydrated petroleum, commercially available from Akzo Nobel Surface Chemistry AB, (Sweden)

2.2 Impurities

In the following examples, the impurities were determined as the HCl-insoluble content (see method above).

2.3 Crude Material

Bright marble from the Region of West-Styria in Austria, including impurities up to max. 5 wt.-%; $d_{50}$=49 to 52 µm.

3. Examples 3.1 Coarse Products After Grinding-Flotation 3.1.1 Inventive

The Grinding-Flotation trials were performed in a vertical Stirred Ball Mill with a grinding volume of 50 l (lab scale) at suspension feed temperature in the range of 30±5° C.

For all trials grinding media with a diameter between 2.5 and 4 mm at a bulk density of 2.5 kg/dm³ were used. Slurry feed was realized continuously by means of a centrifugal pump, introduced into the bottom of the mill. Collector agent addition took place in the feed vessel, equipped with a stirrer. Pressurized air was added to the feed pipe just before entering the stirred ball mill.

After the processing the product exited the mill on top by using a vertical circumferential discharge screen in combination with a collector ring. The foam was collected in a second collector ring above. The solids content of the aqueous crude material suspension added to the Grinding-Flotation mill was in the range of 49 to 52% by dry weight, used water came from the internal plant process water loop. The collector agent dosage rate has been varied between 410 and 820 ppm (see Table 2).

A flotation gas, consisting of pressurized air, was introduced into the slurry feed pipe at dosage rates between 0.5 and 5 m³/h (see Table 1). Best result could be achieved at 1 and 2 m³/h (see Table 1). Simultaneously, the shaft speed of the agitator was adjusted to the values as given in Table 1 below. The foam which was created in the mill could be separated from the suspension by means of the circumferential screen on top of the mill. The remaining suspension was collected and analysed according to the methods as given above.

3.1.2 Comparative

For the current reference trial a 60l Outotec tank cell was used, running in batch operation mode. Results and flotation conditions are given in Table 2.

3.1.4 Discussion of the Results

The comparison of the results in Tables 1 and 2 clearly demonstrates that the inventive process allows to remove a much higher content of impurities than a usual flotation process.

3.1.3 Results

TABLE 1

Results of Grinding-Flotation.

| | | | Collector | | Air dosage | | | Feed | |
|---|---|---|---|---|---|---|---|---|---|
| Test No. | Solids [wt-%] | Collector agent | agent dosage [ppm] | Mill feed [l/h] | rate [m³/h] | Shaft speed [rpm] | Impurities [wt.-%][a] | $d_{50}$ [μm] | Residues >100 [μm] |
| 1 | 52 | A | 410 | 350 | 1 | 175 | 2.71 | 54.7 | 9.7 |
| 2 | 49 | A | 820 | 350 | 1 | 245 | 1.6 | 45.3 | 6.6 |
| 3 | 52 | A | 820 | 350 | 2 | 210 | 2.3 | 54.6 | 9.7 |

| | Feed | | Product | | | | | | |
|---|---|---|---|---|---|---|---|---|---|
| Test No. | Residues 63 to 100 [μm]] | Tappi Brightness | Impurities [wt.-%][a] | d50 [μm] | Residues >100 [μm] | Residues 63 to 100 [μm]] | Tappi Brightness | HCl Reduction[b] [wt-%] | Content recovery [wt.-%][c] |
| 1 | 34.8 | 82.2 | 1.2 | 42.7 | 4.2 | 21.5 | 86.2 | 1.51 | 55.7 |
| 2 | 29.8 | n.a. | 0.37 | 26 | 0.5 | 7.7 | n.a. | 1.23 | 76.9 |
| 3 | 34.8 | 82.2 | 0.9 | 36.1 | 3.4 | 22.7 | 90.5 | 1.40 | 60.9 |

[a] Impurities expressed as compounds insoluble in 8N HCl, impurities are mainly mica;
[b] difference between the impurities (expressed as sum of compounds insoluble in 8N hydrochloric acid) in the crude product and the mass of impurities (expressed as sum of compounds insoluble in 8N hydrochloric acid) in the product after grinding/flotation;
[c] mass of impurities (expressed as sum of compounds insoluble in 8N hydrochloric acid) in the froth/mass of impurities (expressed as sum of compounds insoluble in 8N hydrochloric acid) in the crude material;
n.a. = not available.

TABLE 2

Results of Coarse-Flotation.

| | Flotation data | | | Feed | | | | Product | | |
|---|---|---|---|---|---|---|---|---|---|---|
| Test No. | Solids [wt.-%] | Collector agent | Collector agent dosage [ppm] | Impurities [wt-%][a] | $d_{50}$ [μm] | Residues >100 [μm] | Residues 63 to 100 [μm] | Impurities [wt.-%][a] | HCl Reduction[b] | Content recovery [wt.-%][c] |
| 1 | 50 | A | 250 | 1.58 | 45 | 2.5 | 11.3 | 1.31 | 0.28 | 17.4 |
| 2 | 50 | A | 250 | 1.73 | 45 | 2.5 | 11.3 | 1.05 | 0.68 | 39.1 |
| 3 | 50 | A | 250 | 1.41 | 45 | 2.5 | 11.3 | 0.76 | 0.65 | 45.9 |

[a] Impurities expressed as compounds insoluble in 8N HCl, impurities are mainly mica;
[b] difference between the impurities (expressed as sum of compounds insoluble in 8N hydrochloric acid) in the crude product and the mass of impurities (expressed as sum of compounds insoluble in 8N hydrochloric acid) in the product after grinding/flotation;
[c] mass of impurities (expressed as sum of compounds insoluble in 8N hydrochloric acid) in the froth/mass of impurities (expressed as sum of compounds insoluble in 8N hydrochloric acid) in the crude material.

3.2 Fine Products After Grinding-Flotation

3.2.1 Inventive

The Grinding-Flotation trials were performed in a vertical Stirred Ball Mill with a grinding volume of 20 l (lab scale) at suspension feed temperature in the range of 22±5° C.

For all trials grinding media with a diameter between 2.5 and 4 mm at a bulk density of 2.5 kg/dm³ were used. Slurry feed was realized continuously by means of a centrifugal pump, introduced into the bottom of the mill. Collector agent addition took place in the feed vessel, equipped with a stirrer. Pressurized air was added to the feed pipe just before entering the stirred ball mill.

After the processing the product exited the mill on top by using a vertical circumferential discharge screen in combination with a collector ring. The foam was collected in a second collector ring above. The solids content of the aqueous crude material suspension added to the Grinding-Flotation mill was in the range of 30 to 31.5% by dry weight, used water came from the internal plant process water loop. A flotation gas, consisting of pressurized air, was introduced into the slurry feed pipe at dosage rates between 0.3 and 0.55 m³/h (see Table 3). Simultaneously, the shaft speed of the agitator was adjusted to 620 rpm as given in Table 3 below. The foam which was created in the mill could be separated from the suspension by means of the circumferential screen on top of the mill. The remaining suspension was collected and analysed according to the methods as given above.

3.2.3 Discussion of the Results

The comparison of the feed and product data in Tables 3 clearly demonstrates that the inventive process allows to reduce the HCl insoluble content and increase also the Tappi brightness by several points, what might be needed to bring a poor feed product back into the specification range.

3.2.2 Results

TABLE 3

Results of Grinding-Flotation to obtain a fine product.

| | | Flotation and grinding data | | | | | |
|---|---|---|---|---|---|---|---|
| | | Collector agent B | Collector agent C | Air | Shaft | Feed | |
| Test No. | Solids [wt-%] | dosage [ppm] | dosage [ppm] | dosage rate [m³/h] | speed [rpm] | $d_{50}$ [μm] | Tappi Brightness |
| 1 | 31.3 | 300 | 25 | 0.5 | 620 | 10.16 | 94.4 |
| 2 | 30.8 | 300 | 25 | 0.5 | 620 | 10.16 | 94.4 |
| 3 | 30.5 | 300 | 25 | 0.3 | 620 | 10.16 | 94.4 |

| | Feed | | Product | | | Waste | |
|---|---|---|---|---|---|---|---|
| Test No. | Impurities [wt.-%][a] | YI | $d_{50}$ [μm] | Tappi Brightness | Impurities [wt.-%][a] | YI | $d_{50}$ [μm] | Impurities [wt.-%][a] |
| 1 | 0.07 | 1.07 | 1.85 | 95.20 | 0.05 | 0.98 | n.d. | 0.28 |
| 2 | 0.07 | 1.07 | 1.77 | 95.70 | 0.03 | 0.88 | 1.88 | 0.20 |
| 3 | 0.07 | 1.07 | 1.69 | 95.90 | 0.02 | 0.84 | 1.78 | 0.21 |

[a] Impurities expressed as compounds insoluble in 8N HCl, impurities are mainly mica, n.d. = not determined.

The invention claimed is:

1. An apparatus for simultaneous grinding and froth flotation of at least one crude mineral and/or pigment, comprising
   a) a vessel (1) suitable for containing grinding media (2), a flotation gas, a collector agent and at least one crude mineral and/or pigment;
   b) an agitation unit (3) rotatably mounted in vessel (1);
   c) drive means (4) connected to agitation unit (3) for agitating the grinding media (2) and the at least one crude mineral and/or pigment to grind the at least one crude mineral and/or pigment into at least one ground mineral and/or pigment;
   d) a charge system (5) connected to vessel (1) comprising
      i. a crude mineral and/or pigment feed (5a),
      ii. a collector agent feed (5b), and
      iii. a flotation gas inlet (5c);
   e) a discharge system (6) connected to vessel (1) comprising
      i. a sieve (6a) suitable for separating froth from the ground mineral and/or pigment, and suitable for preventing the grinding media from being discharged with the ground mineral and/or pigment,
      ii. a product collecting zone (6b) suitable for collecting the ground mineral and/or pigment,
      iii. a froth collecting zone (6c) and
      iv. a froth redirecting element (6d) having a conical structure affixed to and around a circumference of the stirring shaft of the agitation unit, wherein said froth redirecting element is arranged above the sieve (6a).

2. The apparatus according to claim 1, characterized in that the froth collecting zone (6c) comprises spraying nozzles (6c1) and/or the discharge system (6) comprises a discharge control valve (6e) or a bypass with overflow (6f) and/or the product collecting zone (6b) is ring-shaped and/or the froth collecting zone (6c) is ring-shaped and/or the froth redirecting element (6d) is ring-shaped.

3. The apparatus according to claim 1, characterized in that the mineral and/or pigment feed (5a) is connected to the bottom (7) of vessel (1), and/or the crude mineral and/or pigment feed (5a), the collector agent feed (5b) and the flotation gas inlet (5c) of the charge system (5) are connected to each other such that the flotation gas and the collector agent are fed together with the at least one crude mineral and/or pigment in vessel (1).

4. The apparatus according to claim 1, characterized in that the at least one crude mineral and/or pigment has/have a weight median particle diameter $d_{50}$ in the range from 20 to 500 μm and the grinding media (2) have a bulk density in the range from 1.5 to 6.0 kg/dm³; and/or the grinding media (2) have a weight median particle diameter $d_{50}$ in the range from 0.2 to 5.0 mm; and/or the at least one crude mineral and/or pigment has/have a weight median particle diameter $d_{50}$ in the range from 0.5 to 20 μm and the grinding media (2) have a bulk density in the range from 1.5 to 6.0 kg/dm³; and/or the grinding media (2) have a weight median particle diameter $d_{50}$ in the range from 0.2 to 5 mm.

5. A process carried out in an apparatus according to claim 1 for manufacturing at least one ground mineral and/or pigment comprising the steps
   I. providing at least one crude mineral and/or pigment, grinding media (2) and at least one collector agent in vessel (1);
   II. mixing the at least one crude mineral and/or pigment, the grinding media (2) and the at least one collector agent as provided in step I. with water to form an aqueous suspension;
   III. passing a flotation gas through flotation gas inlet (5c) into the aqueous suspension formed in step II. and agitating the obtained aqueous suspension by using agitation unit (3) to transform the at least one crude mineral and/or pigment into at least one ground mineral and/or pigment and obtaining thereby a ground mineral and/or pigment bearing phase and a froth;
   IV. recovering the at least one ground mineral and/or pigment by removing the ground mineral and/or pigment bearing phase from the froth obtained in step III.

6. The process according to claim 5, characterized in that the process involves a direct or an indirect flotation step leading to the formation of a froth containing the floated phase and a slurry bearing phase with the remaining ground mineral and/or pigment.

7. The process according to claim 5, characterized in that at least one dispersing agent is added before or during step III. and/or the at least one crude mineral and/or pigment comprises at least one dispersing agent.

8. The process according to claims 5, characterized in that the at least one dispersing agent is selected from the group consisting of sodium, potassium, calcium, magnesium, lithium, strontium, primary amine, secondary amine, tertiaryamine and/or ammonium salts, whereby the amine salts are linear or cyclic, of at least partly neutralized homopolymers or copolymers of (meth)acrylic acid, maleic acid, fumaric acid, itaconic acid and derivatives of these acids; and/or the at least one collector agent is selected from the group consisting of surface active and hydrophobic tensides and/or mixtures thereof; and/or the content of the at least one dispersing agent is in the range from 0.1 to 1.0 wt.-% based on the total weight of the at least one crude mineral and/or pigment in the aqueous suspension; and/or the content of the at least one collector agent is in the range from 0.001 to 5.0 wt.-% based on the total weight of the at least one crude mineral and/or pigment in the aqueous suspension as provided in step II.

9. The process according to claim 5, characterized in that the mill diameter is in a range from 200 to 750 mm and the agitation unit is adjusted to a shaft speed of 150 to 400 rpm or the mill diameter is in the range from 751 to 1 250 mm and the agitation unit is adjusted to a shaft speed of 125 to 350 rpm or the mill diameter is in the range from 1 251 to 1 750 mm and the agitation unit is adjusted to a shaft speed of 100 to 300 rpm.

10. The process according to claim 5, characterized in that the solid content of the aqueous suspension is between 5.0 and 80.0 wt.-% based on the total weight of the at least one crude mineral and/or pigment in the aqueous suspension as provided in step II.

11. The process according to claim 5, characterized in that the at least one crude mineral and/or pigment provided in step I. is a crude white pigment containing material.

12. The process according to claim 11, characterized in that the crude white pigment containing material comprises impurities selected from the group consisting of iron sulphides; iron oxides; silicates; graphite and mixtures thereof, and/or the weight ratio of white pigment to impurities in the crude white pigment containing material (white pigment: impurities) is from 0.1:99.9 to 99.9:0.1, based on the dry weight.

13. The process according to claim 5, characterized in that one or more additives selected from the group consisting of pH-adjusting agents, frothers, depressing agents, solvents, and/or polyelectrolytes are added before step IV.

14. The process according to claim 5, characterized in that the process further comprises the steps of V. dewatering and optionally drying the ground mineral and/or pigment bearing phase obtained in step IV. to remove at least a portion of water to obtain a partially dewatered ground mineral and/or pigment or to obtain a dried ground mineral and/or pigment;

VI. treating the partially dewatered and/or dried ground mineral and/or pigment obtained after dewatering step V. with at least one dispersing agent and re-dilute it to obtain an aqueous suspension comprising a dispersed ground mineral and/or pigment, and/or VII. treating the partially dewatered and/or dried ground mineral and/or pigment before or after dewatering or drying step V. with at least one saturated aliphatic linear or branched carboxylic acid and/or with at least one mono-substituted succinic anhydride and/or at least one mono-substituted succinic acid and/or salty reaction product(s) and/or with at least one phosphoric acid ester blend of one or more phosphoric acid mono-ester and/or reaction products thereof and one or more phosphoric acid di-ester and/or reaction products thereof to obtain a hydrophobized ground mineral and/or pigment.

15. The apparatus of claim 1, wherein the agitation unit (3) consists essentially of the stirring shaft and a plurality of annular disks mounted on the stirring shaft with uniform spacing between the disks.

16. The apparatus of claim 15, wherein the annular disks comprise openings in their radially interior area.

17. The apparatus of claim 1, wherein the sieve has opening sizes in a range of from 0.1 mm to 5.0 mm.

18. The apparatus of claim 1, wherein the sieve has opening sizes in a range of from 0.5 mm to 3.0 mm.

19. The apparatus of claim 1, wherein the froth- collecting zone (6c) is ring-shaped and comprises two or three spraying nozzles (6c1).

20. The apparatus of claim 1, further comprising the grinding media (2) within the vessel (1), wherein the grinding media have a weight media particle diameter $d_{50}$ of from 2.4 mm to 4.0 mm and a bulk density of from 2.2 kg/dm$^3$ to 4.0 kg/dm$^3$.

\* \* \* \* \*